(12) United States Patent
Cheng et al.

(10) Patent No.: US 11,755,151 B2
(45) Date of Patent: Sep. 12, 2023

(54) TERMINAL DEVICE

(71) Applicants: Beijing Xiaomi Mobile Software Co., Ltd., Nanjing Branch, Jiangsu (CN); Beijing Xiaomi Mobile Software Co., Ltd., Beijing (CN)

(72) Inventors: Chihjen Cheng, Beijing (CN); Yanshun Guo, Beijing (CN)

(73) Assignees: Beijing Xiaomi Mobile Software Co., Ltd., Nanjing Branch, Nanjing (CN); Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/981,098

(22) PCT Filed: Apr. 28, 2020

(86) PCT No.: PCT/CN2020/087628
§ 371 (c)(1),
(2) Date: Sep. 15, 2020

(87) PCT Pub. No.: WO2021/217465
PCT Pub. Date: Nov. 4, 2021

(65) Prior Publication Data
US 2023/0042511 A1    Feb. 9, 2023

(51) Int. Cl.
*G06F 3/042* (2006.01)
*G06F 3/041* (2006.01)
(Continued)

(52) U.S. Cl.
CPC .......... *G06F 3/0421* (2013.01); *G06F 3/0418* (2013.01); *G06V 40/1318* (2022.01); *G06F 2203/04107* (2013.01); *G06V 10/147* (2022.01)

(58) Field of Classification Search
CPC ................. G06F 3/0421; G06F 3/0418; G06F 2203/04107; G06V 40/1318; G06V 10/147
See application file for complete search history.

(56) References Cited

U.S. PATENT DOCUMENTS

2018/0217698 A1* 8/2018 Jung ..................... G06F 3/0446
2019/0205603 A1* 7/2019 Lee ..................... G06V 40/1329
(Continued)

FOREIGN PATENT DOCUMENTS

CN    109492457 A    3/2019
CN    208848221 U    5/2019
(Continued)

OTHER PUBLICATIONS

Notice of Reasons for Refusal for Japanese Application No. 2020-555185, dated Aug. 5, 2022.
(Continued)

*Primary Examiner* — Afroza Chowdhury
(74) *Attorney, Agent, or Firm* — Finnegan, Henderson, Farabow, Garrett & Dunner, L.L.P.

(57) ABSTRACT

The present disclosure provides a terminal device. The terminal device includes a touch display layer, a fingerprint detection layer, and a shielding layer. The touch display layer includes a touch display surface. The fingerprint detection layer is arranged on a side of the touch display layer opposite the touch display surface. The shielding layer is arranged on the side of the touch display layer opposite the touch display surface. A part of the shielding layer corresponding to the fingerprint detection layer is located on a side of the fingerprint detection layer opposite the touch display layer. The shielding layer includes an electromagnetic shielding layer connected to a grounding end of the terminal device, and at least a part of the electromagnetic
(Continued)

shielding layer is located on the side of the fingerprint detection layer opposite the touch display layer.

20 Claims, 6 Drawing Sheets

(51) Int. Cl.
*G06V 40/13* (2022.01)
*G06V 10/147* (2022.01)

(56) References Cited

U.S. PATENT DOCUMENTS

2019/0251318 A1\* 8/2019 Jung ................. H10K 50/8445
2019/0303640 A1  10/2019 Song et al.
2020/0327296 A1\* 10/2020 Wu ..................... H01L 27/1462

FOREIGN PATENT DOCUMENTS

| KR | 20160132761 A | 11/2016 |
| KR | 20180130151 A | 12/2018 |
| KR | 20190001881 A | 1/2019 |
| KR | 20190019339 A | 2/2019 |
| WO | WO 2019097145 A1 | 5/2019 |

OTHER PUBLICATIONS

Notification of Reason for Refusal for Korean Application No. 10-2020-7029038, dated Sep. 27, 2021.
International Search Report and Written Opinion for Application No. PCT/CN2020/087628, dated Feb. 1, 2021.

\* cited by examiner

TERMINAL DEVICE

CROSS REFERENCE TO RELATED APPLICATIONS

This application is a national phase application based on International Application No. PCT/CN2020/087628, filed Apr. 28, 2020, the content of which is incorporated herein by reference.

TECHNICAL FIELD

The present disclosure generally relates to the field of terminal devices, and more particularly, to a terminal device.

BACKGROUND

With the development of full-screen technologies, the under-screen fingerprint technology has become a main development trend of fingerprint detection. The under-screen fingerprint technology means that a fingerprint detection layer of a terminal device is arranged below a touch display layer. The larger an area of the fingerprint detection layer is, the larger a fingerprint detection area of the terminal device is, which will boost the accuracy and security of fingerprint detection, and improve the user experience. However, due to poor light transmittance of an electromagnetic shielding layer of the touch display layer, if the area of the fingerprint detection layer is made large, an area of the electromagnetic shielding layer needs to be smaller to give way to the fingerprint detection layer, which is not conducive to protection for the touch display layer by the electromagnetic shielding layer.

SUMMARY

The present disclosure provides an improved terminal device.

The present disclosure provides a terminal device. The terminal device includes a touch display layer including a touch display surface; a fingerprint detection layer arranged on a side of the touch display layer opposite the touch display surface; and a shielding layer arranged on the side of the touch display layer opposite the touch display surface, a part of the shielding layer corresponding to the fingerprint detection layer being located on a side of the fingerprint detection layer opposite the touch display layer, the shielding layer comprising an electromagnetic shielding layer connected to a grounding end of the terminal device, and at least a part of the electromagnetic shielding layer located on the side of the fingerprint detection layer opposite the touch display layer.

Optionally, at least a part of the electromagnetic shielding layer is attached to the side of the fingerprint detection layer opposite the touch display layer.

Optionally, an orthographic projection of the fingerprint detection layer on the electromagnetic shielding layer is completely located on the electromagnetic shielding layer.

Optionally, the electromagnetic shielding layer is connected to the grounding end by a conductive member, and the conductive member is arranged at an edge of the electromagnetic shielding layer.

Optionally, the conductive member includes at least one of a first flexible printed circuit board, a conductive fabric, and a conductive adhesive.

Optionally, terminal device further includes a casing, wherein the touch display layer is mounted to the casing, the fingerprint detection layer is mounted between the touch display layer and the casing, and the side of the fingerprint detection layer opposite the touch display layer is attached to the casing through at least a part of the shielding layer.

Optionally, the casing is provided with a groove, wherein the groove has an opening facing the touch display layer, and the fingerprint detection layer and at least a part of the shielding layer are located in the groove.

Optionally, the shielding layer further includes a buffer layer, and the buffer layer is attached between the electromagnetic shielding layer and the casing.

Optionally, the fingerprint detection layer is attached to the side of the touch display layer opposite the touch display surface, and at least a part of the electromagnetic shielding layer is attached to the side of the fingerprint detection layer opposite the touch display layer.

Optionally, the terminal device further includes a signal reading module. The signal reading module includes a first reading chip and a second reading chip integrated as a whole. The first reading chip is connected to the fingerprint detection layer to read an electrical signal output by the fingerprint detection layer, and the second reading chip is connected to the touch display layer to read an electrical signal output by the touch display layer.

Optionally, the signal reading module is connected to the touch display layer and the fingerprint detection layer through a second flexible circuit board.

Optionally, an orthographic projection of the fingerprint detection layer on the touch display layer is equal to an area of the touch display layer.

Optionally, the fingerprint detection layer comprises a fingerprint sensing layer and a light adjusting layer arranged between the fingerprint sensing layer and the touch display layer; wherein the light adjusting layer comprises a microlens array and a second collimating layer; the second collimating layer is arranged between the microlens array and the fingerprint sensing layer; and the second collimating layer is provided with a second collimating hole communicating the microlens array with the fingerprint sensing layer.

With at least a part of the electromagnetic shielding layer located on the side of the fingerprint detection layer opposite the touch display layer, the part of the touch display layer corresponding to the fingerprint detection layer can be protected, and hence the part of the touch display layer corresponding to the fingerprint detection layer is prevented from being subject to electromagnetic radiation caused by the arrangement of the fingerprint detection layer, so as to solve the problem that the electromagnetic shielding layer fails to effectively protect the touch display layer due to an enlarged size of the fingerprint detection layer.

BRIEF DESCRIPTION OF THE DRAWINGS

In order to describe technical scheme of embodiments of the present disclosure more clearly, the accompanying drawings, which are used for describing embodiments, are simply introduced hereinafter. Obviously, the described drawings are only part of embodiments of the present disclosure, other drawings can be achieved by those of ordinary skill in the art without creative work based on the embodiments in the present disclosure.

DETAILED DESCRIPTION

Referring to accompanying drawings of embodiments of the present disclosure, technical scheme of the embodiments of the present disclosure will be described clearly and completely. Obviously, the described embodiments are merely a part of but not all of the embodiments of the present disclosure. All other embodiments obtained by persons of ordinary skill in the art based on the embodiments of the present disclosure without creative efforts shall fall within the protection scope of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items. Unless specified or limited otherwise, the terms such as "front," "rear", "lower", and/or "upper," etc. are used for convenience of description and not limited to one position or one orientation. Terms such as "connected," and "coupled" are not restricted to physical or mechanical connections or couplings, but include electrical connections not matter directly or indirectly. The term "a plurality of" or "a number of" and the like means two or more than two.

Figure 1:
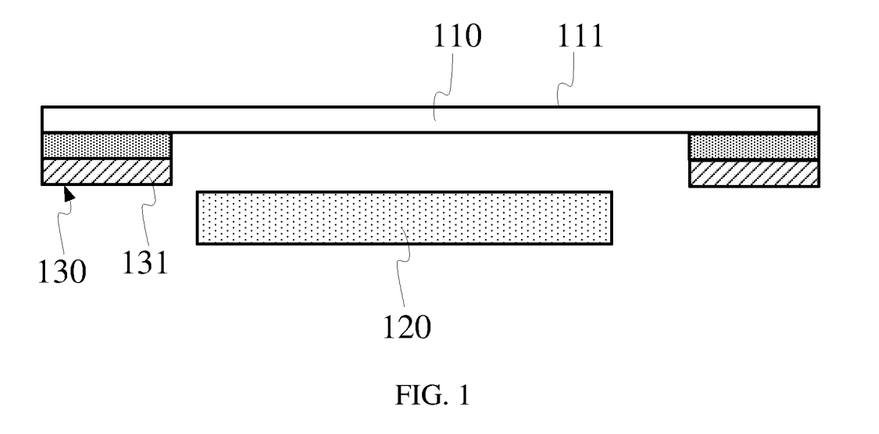
FIG. 1 is a sectional view of a partial structure of a terminal device according to an exemplary embodiment.

With the rapid development of the under-screen fingerprint technology, a fingerprint detection area of a terminal device is enlarged, which improves the user's experience of fingerprint detection. In some embodiments, referring to FIG. 1 that shows a sectional view of a partial structure of a terminal device, the terminal device includes a touch display layer 110, a fingerprint detection layer 120, and a shielding layer 130. The touch display layer 110 includes a touch display surface 111. The shielding layer 130 is arranged on a side of the touch display layer 110 opposite the touch display surface 111. The fingerprint detection layer 120 is arranged on a side of the shielding layer 130 opposite the touch display layer 110. A part of the shielding layer 130 corresponding to the fingerprint detection layer 120 is removed, such that light can be irradiated from the touch display layer 110 to the fingerprint detection layer 120, and fingerprint detection by the detection layer 120 is facilitated. It can be understood that an area of the touch display layer 110 corresponding to the fingerprint detection layer 120 is a fingerprint detection area. The shielding layer 130 includes a copper foil 131 connected to a grounding end to prevent electromagnetic radiation and protect the touch display layer 110. However, if the fingerprint detection area is enlarged, an area of the fingerprint detection layer 120 needs to be enlarged, and as a result, a larger part of the shielding layer 130 needs to be removed to give way to the fingerprint detection layer 120. Accordingly, an area of the copper foil 131 is reduced, which is not conducive to the protection for the touch display layer 110 by the copper foil 131.

Based on the above defects, embodiments of the present disclosure provide a terminal device that includes but is not limited to a mobile phone, a personal computer, a wearable device, or a medical device, etc. The mobile phone is exemplified as a mobile phone in the following description with reference to the drawings.

Figure 2:
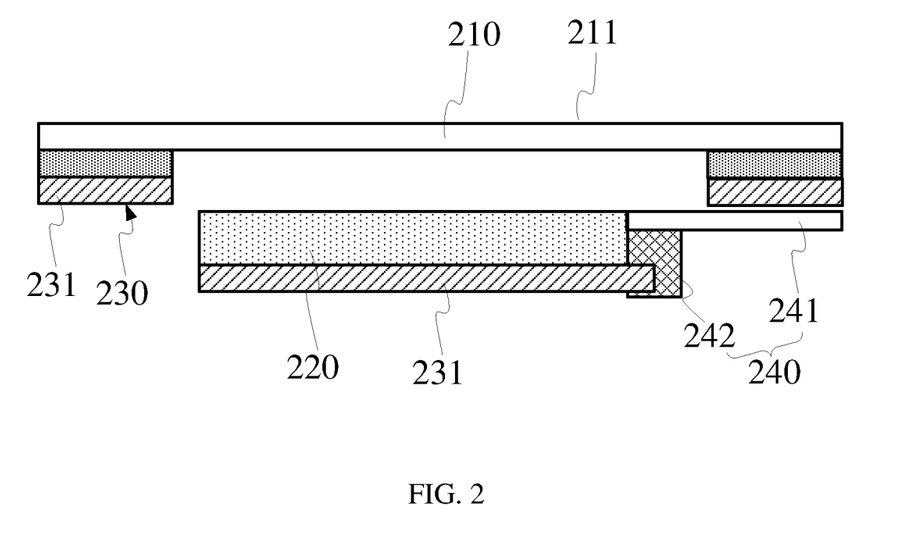
FIG. 2 is a sectional view of a partial structure of a terminal device according to an exemplary embodiment of the present disclosure.

FIG. 2 is a sectional view of a partial structure of a terminal device according to an exemplary embodiment of the present disclosure. Referring to FIG. 2, the terminal device includes a touch display layer 210, a fingerprint detection layer 220, and a shielding layer 230.

In the embodiment of the present disclosure, the touch display layer 210 includes a display layer and a touch layer. The display layer is configured to display figures or images, and the touch layer is configured to capture positions of touch points pressed by a finger. For example, the display layer and the touch layer may be arranged in a stacked manner. For example, the display layer and the touch layer may be integrated into one layer, which is not specifically limited in this disclosure. The touch display layer 210 includes a touch display surface 211 for display and touch. For example, the touch display layer 210 may be a flexible touch display layer 210. For example, the touch display layer 210 may be a rigid touch display layer 210. For example, the display layer may be a liquid crystal display (LCD) layer or an organic light-emitting diode (OLED) layer.

The fingerprint detection layer 220 is arranged on a side of the touch display layer 210 opposite the touch display surface 211. It should be noted that the fingerprint detection layer 220 is an optical fingerprint detection layer 220 and is configured to receive light passing through the touch display layer 210 and convert an optical signal into an electrical signal, based on which a fingerprint image is formed for fingerprint detection.

The shielding layer 230 is arranged on the side of the touch display layer 210 opposite the touch display surface 211, and a part of the shielding layer 230 corresponding to the fingerprint detection layer 220 is located on a side of the fingerprint detection layer 220 opposite the touch display layer 210. The shielding layer 230 includes an electromagnetic shielding layer 231 connected to a grounding end of the terminal device, and at least a part of the electromagnetic shielding layer 231 is located on the side of the fingerprint detection layer 220 opposite the touch display layer 210. It can be understood that the light transmittance of the shielding layer 230 is poor, which impairs penetration of the light. There is no shielding layer 230 between the touch display layer 210 and the fingerprint detection layer 220, so it is ensured that the light can be irradiated onto the fingerprint detection layer 220 through the touch display layer 210, thereby facilitating the fingerprint detection of the fingerprint detection layer 220. For example, a printed circuit board (PCB) of the terminal device is provided with the grounding end, and by connecting the electromagnetic shielding layer 231 to the grounding end, the electromagnetic shielding layer 231 can bring about an effect of preventing electromagnetic radiation. For example, the electromagnetic shielding layer 231 includes a metal layer, and the metal layer may include copper foil, aluminum foil or iron foil, etc.

Based on the above, by making at least a part of the electromagnetic shielding layer 231 located on the side of the fingerprint detection layer 220 opposite the touch display layer 210, a part of the touch display layer 210 corresponding to the fingerprint detection layer 220 can be protected, and hence the part of the touch display layer 210 corresponding to the fingerprint detection layer 220 is prevented from being subject to electromagnetic radiation caused by the arrangement of the fingerprint detection layer 220. That is, the part of the electromagnetic shielding layer 231 corresponding to the fingerprint detection layer 220 compensates a part of electromagnetic shielding layer 231 which is missing due to the arrangement of the fingerprint detection layer 220. In this way, the part of the electromagnetic shielding layer 231 corresponding to the fingerprint detection layer 220 and/or the part of the electromagnetic shielding layer 231 not corresponding to the fingerprint detection layer 220 cooperate to protect the touch display layer 210, solving the problem that the electromagnetic shielding layer 231 fails to effectively protect the touch display layer 210 due to an enlarged size of the fingerprint detection layer 220.

In order to make the terminal device provided by the embodiments of the present disclosure to be clearly understood, detail description in combination with the drawings is provided hereinafter.

In some embodiments, referring to FIG. 2, at least a part of the electromagnetic shielding layer 231 is attached to the side of the fingerprint detection layer 220 opposite the touch display layer 210. In this way, a distance between the electromagnetic shielding layer 231 and the touch display layer 210 is reduced, which makes it more effective for the electromagnetic shielding layer 231 to shield the electromagnetic radiation around the touch display layer 210, thereby effectively protecting the touch display layer 210.

Furthermore, in some embodiments, an orthographic projection of the fingerprint detection layer 220 on the electromagnetic shielding layer 231 is completely located on the electromagnetic shielding layer 231. For example, respective attaching surfaces of the fingerprint detection layer 220 and the electromagnetic shielding layer 231, with which the fingerprint detection layer 220 and the electromagnetic shielding layer 231 are attached to each other, have equal areas. For example, an area of an attaching surface of the electromagnetic shielding layer 231 facing the fingerprint detection layer 220 is larger than an attaching surface of the fingerprint detection layer 220 facing the electromagnetic shielding layer 231. Thus, the size of the electromagnetic shielding layer 231 is enlarged, and the electromagnetic shielding layer 231 can supplementarily shield the electromagnetic radiation around the shielding touch display layer 210 more effectively.

In some embodiments, referring to FIG. 2, the electromagnetic shielding layer 231 is connected to the grounding end by a conductive member 240, and the conductive member 240 is arranged at an edge of the electromagnetic shielding layer 231. In this way, a length of the conductive member 240 can be reduced, marginal space inside the terminal device can be reasonably and fully utilized, and the integration degree of the terminal device can be improved.

Figure 3:
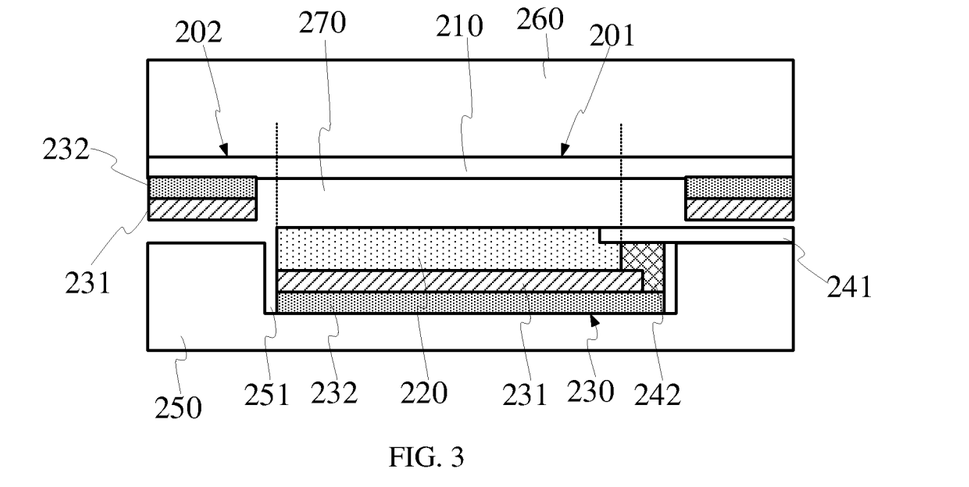
FIG. 3 is a sectional view of a partial structure of a terminal device according to an exemplary embodiment of the present disclosure.
Figure 4:
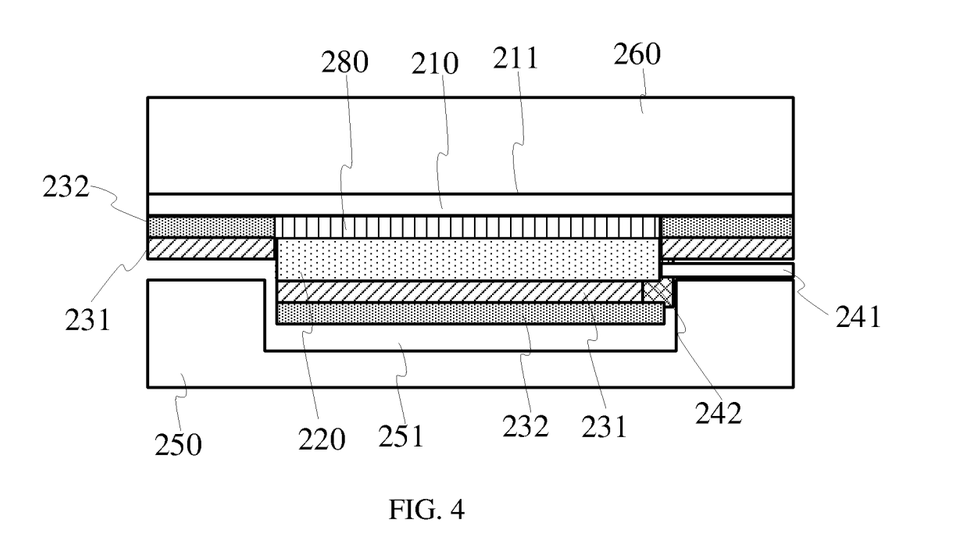
FIG. 4 is a sectional view of a partial structure of a terminal device according to an exemplary embodiment of the present disclosure.

Furthermore, in some embodiments, the conductive member 240 includes at least one of a first flexible printed circuit board (FPC) 241, a conductive, and a conductive adhesive 242. For example, referring to FIG. 2, the conductive member 240 includes the first flexible circuit board 241 and the conductive adhesive 242; the first flexible circuit board 241 is arranged at an edge of the fingerprint detection layer 220 and connected to the grounding end of the terminal device; the conductive adhesive 242 is connected to the first flexible circuit board 241 and the edge of the electromagnetic shielding layer 231. In some embodiments, the first flexible circuit board 241 and the conductive adhesive 242 can be applied to spaces of different structures, which is conducive to the reasonable planning of an internal space of the terminal device and enables the electromagnetic shielding layer 231 to be connected to the grounding end. For example, the terminal device realizes signal transmission with the fingerprint detection layer 220 through a flexible circuit board, and the flexible circuit board is used as the first flexible circuit board 241 to be connected to the electromagnetic shielding layer 231, avoiding extra arrangement of the first flexible circuit board 241, which is more conducive to improvement of the integration degree of the terminal device. FIG. 3 is a sectional view of a partial structure of a terminal device according to an exemplary embodiment of the present disclosure. FIG. 4 is a sectional view of a partial structure of a terminal device according to an exemplary embodiment of the present disclosure. In some embodiments, referring to FIG. 3 and FIG. 4, the terminal device also includes a casing 250, the touch display layer 210 is mounted to the casing 250, and the fingerprint detection layer 220 is mounted between the touch display layer 210 and the casing 250. For example, the casing 250 includes a front case, a middle frame, and a back cover. The touch display layer 210 and the fingerprint detection layer 220 can be mounted to the middle frame. After the middle frame, the front case, the back cover, and respective modules are mounted, the terminal device is assembled completely. For example, the touch display surface 211 of the touch display layer 210 is also covered by a glass cover plate 260 to protect the touch display layer 210.

In some embodiments, referring to FIG. 3, the side of the fingerprint detection layer 220 opposite the touch display layer 210 is attached to the casing 250 by at least a part of the shielding layer 230, that is, the fingerprint detection layer 220 is fixed to the casing 250 to facilitate the stable fixation of the fingerprint detection layer 220.

Furthermore, in some embodiments, referring to FIG. 3, the casing 250 is provided with a groove 251, the groove 251 has an opening facing the touch display layer 210, and the fingerprint detection layer 220 and at least a part of the shielding layer 230 are located in the groove 251. In this way, the groove 251 protects the fingerprint detection layer 220 and increases the internal space of the terminal device, thereby improving the integration degree of the terminal device. For example, the middle frame has a thickness of greater than 0.3 mm and is provided with the groove 251, and the fingerprint detection layer 220 has a thickness of less than 0.3 mm and is arranged in the groove 251.

Furthermore, in some embodiments, referring to FIG. 3, the shielding layer 230 also includes a buffer layer 232, and the buffer layer 232 is attached between the electromagnetic shielding layer 231 and the casing 250. In some embodiments, an inner wall of the casing 250 may have an irregular structure, and the buffer layer 232 can play a buffering and sealing role, and the flatness of various film layers can be ensured. For example, the buffer layer 232 includes foam, and the foam is light in weight and has good deformability.

In other embodiments, referring to FIG. 4, the fingerprint detection layer 220 is attached to the side of the touch display layer 210 opposite the touch display surface 211, and at least a part of the electromagnetic shielding layer 231 is attached to the side of the fingerprint detection layer 220 opposite the touch display layer 210. For example, the buffer layer 232 is attached to a side of the electromagnetic shielding layer 231 opposite the fingerprint detection layer 220.

In some embodiments, an area of the fingerprint detection layer 220 is smaller than an area of the touch display layer 210. That is, the touch display layer 210 includes a first part 201 corresponding to the fingerprint detection layer 220 and a second part 202 not corresponding to the fingerprint detection layer 220. Referring to FIG. 3, the shielding layer 230 corresponding to the second part 202 of the touch display layer 210 may be directly attached to the side of the touch display layer 210 opposite the touch display surface 211, and the shielding layer 230 corresponding to the first part 201 of the touch display layer 210 may be attached to the side of the fingerprint detection layer 220 opposite the touch display layer 210. By cooperation of the electromagnetic shielding layers 231 in the shielding layer 230 corresponding to the first part 201 and the second part 202 of the touch display layer 210 respectively, the electromagnetic radiation can be effectively prevented, and the touch display layer 210 can be effectively protected. For example, the buffer layer 232 corresponding to the second part 202 of the touch display layer 210 is located between the electromagnetic shielding layer 231 and the touch display layer 210 to provide effective shielding. For example, the buffer layer 232 corresponding to the second part 202 of the touch display layer 210 may also be arranged on the side of the electromagnetic shielding layer 231 opposite the touch display layer 210, which is not specifically defined in the present disclosure.

Figure 5:
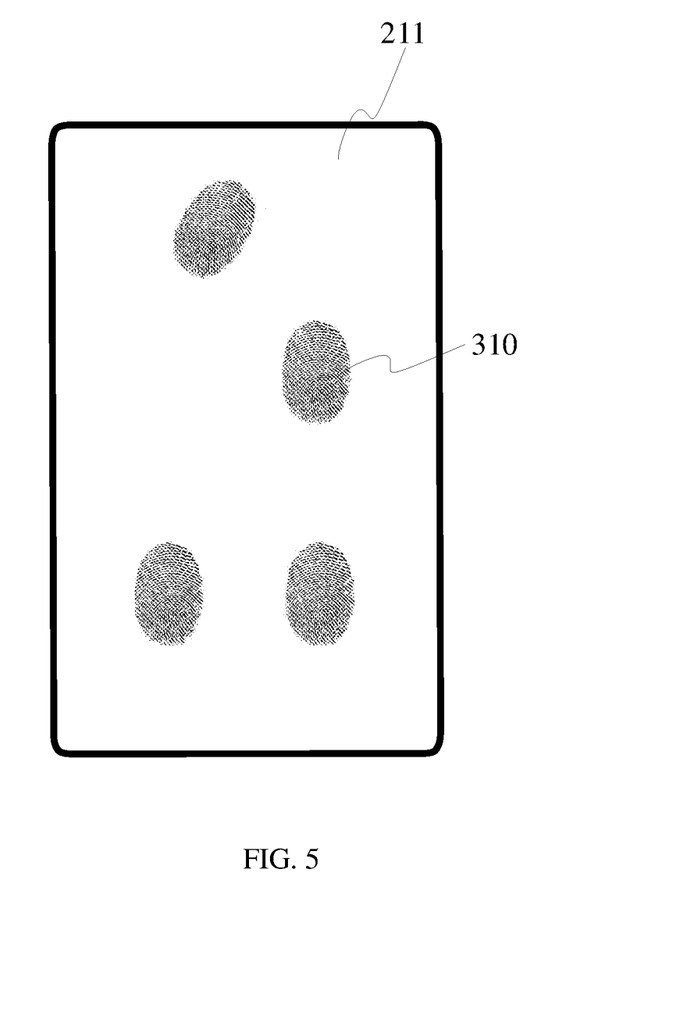
FIG. 5 is a schematic view of a touch display surface of a terminal device according to an exemplary embodiment of the present disclosure.

In other embodiments, an orthographic projection of the fingerprint detection layer 220 on the touch display layer 210 is equal to an area of the touch display layer 210, that is, the fingerprint detection layer 220 is completely corresponding to the touch display layer 210, such that a full screen of the terminal device can detect fingerprint. Referring to FIG. 5, FIG. 5 is a schematic view of a touch display surface of a terminal device according to an exemplary embodiment of the present disclosure. The whole touch display surface 211 of the terminal device can be used as a fingerprint detection area, and a plurality of fingers can press the touch display surface 211 at the same time. The terminal device can detect a plurality of fingerprints 310 to realize accurate and safe fingerprint detection. For instance, by increasing the fingerprint detection area, the terminal device can identify more fingerprint feature points, thus improving the accuracy of fingerprint detection. By increasing the fingerprint detection area, users can conveniently detect fingerprints in any area. By increasing the fingerprint detection area, a multiple-fingerprint detection function can be realized, and the accuracy and security of payment, unlocking and other fingerprint identification can be improved.

Figure 6:
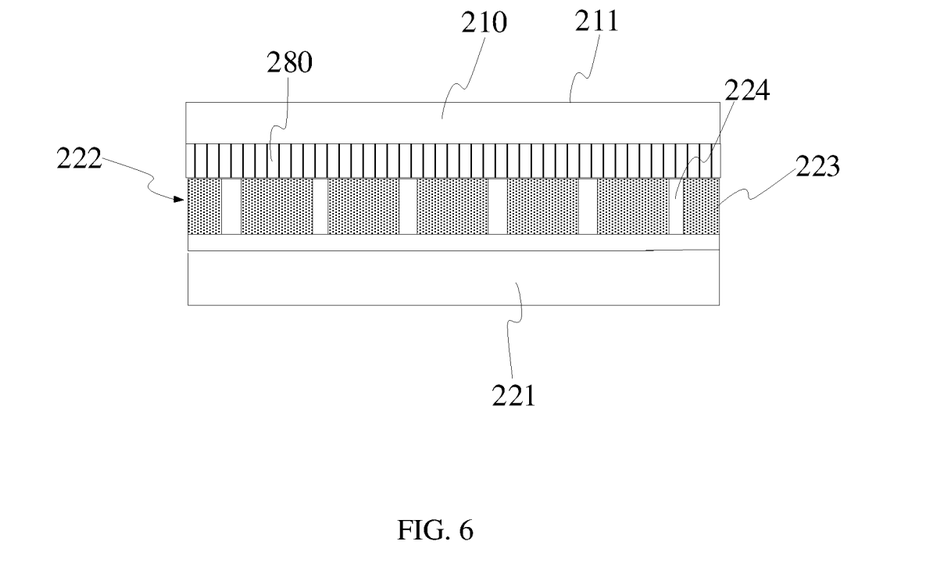
FIG. 6 is a sectional view of a partial structure of a touch display layer and a fingerprint detection layer according to an exemplary embodiment of the present disclosure.
Figure 7:
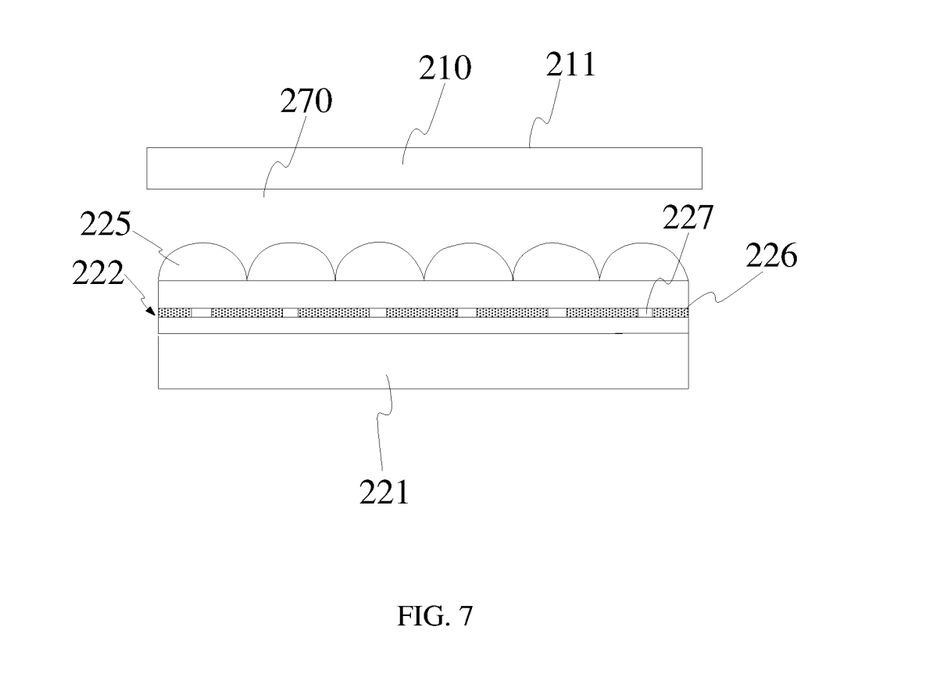
FIG. 7 is a sectional view of a partial structure of a touch display layer and a fingerprint detection layer illustrated according to an exemplary embodiment of the present disclosure.

FIG. 6 shows a sectional view of a partial structure of the touch display layer 210 and the fingerprint detection layer 220 according to an exemplary embodiment of the present disclosure. FIG. 7 shows a sectional view of a partial structure of the touch display layer 210 and the fingerprint detection layer 220 according to an exemplary embodiment of the present disclosure. In some embodiments, in combination with reference to FIG. 6 and FIG. 7, the fingerprint detection layer 220 includes a fingerprint sensing layer 221 and a light adjusting layer 222 arranged between the fingerprint sensing layer 221 and the touch display layer 210, that is, the light adjusting layer 222 is arranged at a side of the fingerprint sensing layer 221 receiving the light. For example, referring to FIG. 6, the light adjusting layer 222 includes a first collimating layer 223, the first collimating layer 223 is provided with a plurality of first collimating holes 224 communicating the touch display layer 210 with the fingerprint sensing layer 221, such that the collimated light can be introduced to the fingerprint sensing layer 221, avoiding mutual interference between the light reflected by a ridge and valley of a fingerprint. However, the first collimating hole 224 needs to have a large depth-to-width ratio (a ratio of a depth of the first collimating hole 224 to an aperture) to ensure the light input. The first collimating layer 223 can be thickened to increase the depth-to-width ratio of the first collimating hole 224, which increases a thickness of the fingerprint detection layer 220 and is not conducive to improvement of the integration of the terminal device.

In some other embodiments, referring to FIG. 7, the light adjusting layer 222 includes a microlens array 225, and a second collimating layer 226 arranged between the microlens array 225 and the fingerprint sensing layer 221. The second collimating layer 226 is provided with a second collimating hole 227 connecting the microlens array 225 with the fingerprint sensing layer 221. In some embodiments, the light enters the second collimating hole 227 after being focused by the microlens array 225, which facilitates collimation of the light by the second collimating hole 227 and avoids mutual interference between the light reflected by the ridge and valley of the fingerprint. Since the microlens array 225 is used to focus the light, the light input of the second collimating hole 227 can be ensured when the depth-to-width ratio of the second collimating hole 227 is small Therefore, the thickness of the second collimating layer 226 can be thinned, which is conducive to reduction in the thickness of the fingerprint detection layer 220, so as to improve the integration of the terminal device.

For example, the thickness of the first collimating layer 223 is 0.2 mm, and the thickness of the second collimating layer 226 can be 0.05 mm by using the microlens array 225 to concentrate. For example, by using the light adjusting layer 222 including the microlens array 225, the thickness of the fingerprint detection layer 220 can be reduced to less than 0.3 mm, which is conducive to improvement of the integration of the terminal device.

In some embodiments, referring to FIG. 7, the light adjusting layer 222 includes a microlens array 225 and an air layer 270 formed between the microlens array 225 and the touch display layer 210. For example, a thickness of the air layer 270 is 0.2 mm Since the air layer 270 and the microlens array 225 have different refractive indexes, facilitating concentration of light by the microlens array 225.

In some embodiments, referring to FIG. 6, the light adjusting layer 222 includes the first collimating layer 223, and the first collimating layer is adhered to the side of the touch display layer 210 opposite the touch display surface 211 through an optically clear adhesive (OCA) layer 280. In other embodiments, the light adjusting layer 222 includes a microlens array 225 and a second collimating layer 226. The microlens array 225 is adhered to the side of the touch display layer 210 opposite the touch display surface 211 through the OCA layer 280. In such case, the air layer 270 between the microlens array 225 and the touch display layer 210 in FIG. 7 is replaced with the OCA layer 280. In order to enable the microlens array 225 to concentrate light, the OCA layer 280 and the microlens array 225 need to have different refractive indexes. For example, a refractive index of the OCA layer 280 is about 1.2, and a refractive index of the microlens array 225 is about 1.6.

Figure 8:
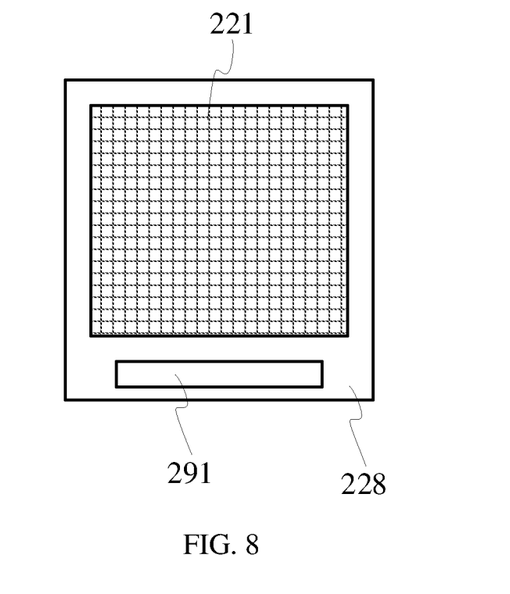
FIG. 8 is a top view of a fingerprint detection layer according to an exemplary embodiment of the present disclosure.
Figure 9:
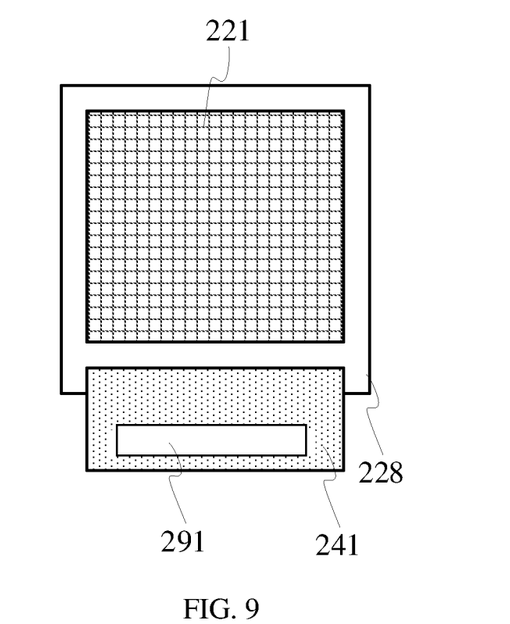
FIG. 9 is a top view of a fingerprint detection layer according to an exemplary embodiment of the present disclosure.

FIG. 8 shows a top view of the fingerprint detection layer 220 according to an exemplary embodiment of the present disclosure. FIG. 9 shows a top view of the fingerprint detection layer 220 according to an exemplary embodiment of the present disclosure. In some embodiments, referring to FIG. 8, the fingerprint detection layer 220 includes a glass substrate 228, the fingerprint sensing layer 221 is formed on the glass substrate 228, and a first reading chip 291 is bonded to the glass substrate 228 to read an electrical signal output by the fingerprint sensing layer 221. In this way, that the first reading chip 291 occupies other space in the terminal device can be avoided. In other embodiments, referring to FIG. 9, the fingerprint detection layer 220 includes a glass substrate 228, the fingerprint sensing layer 221 is formed on the glass substrate 228, a first reading chip 291 is arranged on a first flexible circuit board 241, the first flexible circuit board 241 is connected to the fingerprint sensing layer 221, and the first reading chip 291 is used to read an electrical signal output by the fingerprint sensing layer 221. With the first flexible circuit board 241, a space of an inner edge of the terminal device can be occupied, which is conducive to improvement of the integration degree of the terminal device. In addition, since the glass substrate 228 is cheaper than a silicon substrate, a cost can be reduced with the fingerprint detection layer 220 including the glass substrate 228.

Figure 10:
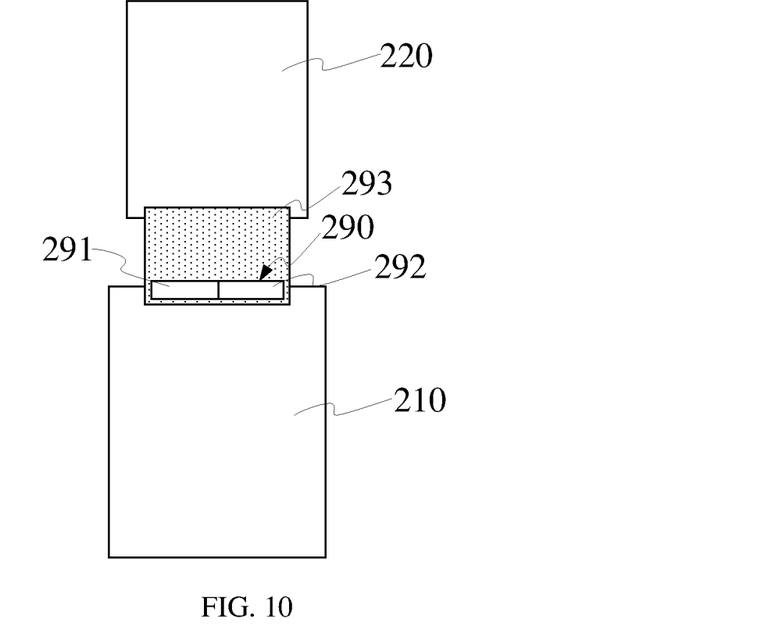
FIG. 10 is a schematic view illustrating connection between a fingerprint detection layer and a touch display layer according to an exemplary embodiment of the present disclosure.

FIG. 10 shows connection between the fingerprint detection layer 220 and the touch display layer 210 according to an exemplary embodiment of the present disclosure. In some embodiments, referring to FIG. 10, the terminal device also includes a signal reading module 290. The signal reading module 290 includes a first reading chip 291 and a second reading chip 292 which are integrated as a whole. The first reading chip 291 is connected to the fingerprint detection layer 220 to read an electrical signal output by the fingerprint detection layer 220, and the second reading chip 292 is connected to the touch display layer 210 to read an electrical signal output by the touch display layer 210. In this way, the first reading chip 291 and the second reading chip 292 are integrated into a signal reading module 290, which is conducive to reduction in a space occupied by the first reading chip 291 and the second reading chip 292 and improvement of the integration degree of the terminal device. Compared with purchase of two reading chips, i.e. the first reading chip 291 and the second reading chip 292, a cost is also reduced.

In some embodiments, with reference to FIG. 10, the signal reading module 290 is connected to the touch display layer 210 and the fingerprint detection layer 220 through a second flexible circuit board 293. In this way, an irregular space in the terminal device can be adapted with the second flexible circuit board 293, facilitating improvement of the integration degree of the terminal device. For example, the second flexible circuit board 293 and the first flexible circuit board 241 are a same flexible circuit board. For example, the second flexible circuit board 293 and the first flexible circuit board 241 are different flexible circuit boards.

Figure 11:
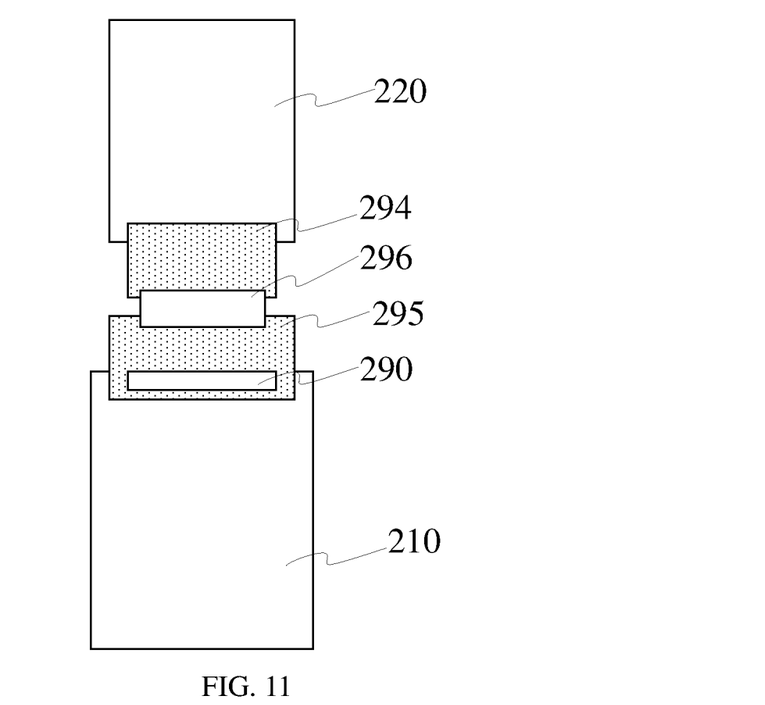
FIG. 11 is a schematic view illustrating connection between a fingerprint detection layer and a touch display layer according to an exemplary embodiment of the present disclosure.

FIG. 11 shows connection between the fingerprint detection layer 220 and the touch display layer 210 according to an exemplary embodiment of the present disclosure. For example, referring to FIG. 11, the second flexible circuit board 293 includes a first sub flexible circuit board 294 and a second sub flexible circuit board 295. The first flexible circuit board 294 is connected to the fingerprint detection layer 220, the second flexible circuit board 295 is connected to the touch display layer 210, a signal reading module 290 is arranged on the second flexible circuit board 295, and the first sub flexible circuit board 294 is connected to the second sub flexible circuit board 295 through a connector 296. With connection by the connector 296, when either of the fingerprint detection layer 220 and the touch display layer 210 fails, the fingerprint detection layer 220 and the touch display layer 210 can be easily separated by the connector 296. For example, the signal reading module 290 can also be arranged on the first sub flexible circuit board 294, which is not specifically defined in the present disclosure.

To sum up, in the terminal device provided by the embodiments of the present disclosure, the part of the touch display layer 210 opposite the fingerprint detection layer 220 can be protected by arranging at least a part of the electromagnetic shielding layer 231 on the side of the fingerprint detection layer 220 corresponding to the touch display layer 210, to avoid electromagnetic radiation on the part of the touch display layer 210 due to arrangement of the fingerprint detection layer 220. Furthermore, the problem that electromagnetic shielding layer 231 fails to effectively protect touch display layer 210 due to enlargement of the size of fingerprint detection layer 220 is solved. The fingerprint detection layer 220 can be attached to the casing 250 or the touch display layer 210, which is not only conducive to stabilization of the fingerprint detection layer 220, but also conducive to improvement of the integration degree of the terminal device. With the fingerprint detection layer 220 including the microlens array 225 and the second collimating layer 226, the thickness of the fingerprint detection layer 220 is reduced, and the integration degree of the terminal equipment is improved. By integrating the first reading chip 291 and the second reading chip 292 into the signal reading module 290, it is not only beneficial to reduction in the occupied space, but also to reduction in the cost. The structure of the terminal device can be applied to a flexible screen and a rigid screen, and has a high integration degree, a low cost, and good market competitiveness.

The above embodiments of the present disclosure can complement each other without conflict.

It should be noted that in this application, relational terms such as "first" and "second" are only used to distinguish one entity or operation from another, and do not necessarily require or imply any such actual relationship or order between these entities or operations. The terms "comprise," "include," or any other variation thereof are intended to cover nonexclusive inclusion, such that a process, method, article, or device that includes a set of elements includes not only those elements, but also other elements that are not explicitly listed, or that are inherent to such process, method, article or device. In the absence of more restrictions, the element defined by the statement "include(s) a . . . " does not exclude the existence of another identical element in the process, method, article or device including the element.

The method and device provided by the embodiments of the disclosure are introduced in detail. In this application, the principle and implementations of the disclosure are described by using specific examples. The description of the above embodiments is only used to help understand the method and core idea of the disclosure. Meanwhile, for persons of ordinary skill in the art, there will be changes in the specific implementations and application scope according to the idea of the disclosure. In conclusion, the contents of this specification should not be interpreted as a limitation of the disclosure.

The contents disclosed in this patent document contain copyrighted materials. The copyright is owned by the copyright owner. The copyright owner does not object to the reproduction of the patent document or the disclosure of the patent existing in the official records and archives of the Patent and Trademark Office.

What is claimed is:

1. A terminal device, comprising:
   a touch display layer comprising a touch display surface;
   a fingerprint detection layer arranged on a side of the touch display layer facing away from the touch display surface; and
   a shielding layer arranged on the side of the touch display layer facing away from the touch display surface, a part of the shielding layer corresponding to the fingerprint detection layer being located on a side of the fingerprint detection layer facing away from the touch display layer, the shielding layer comprising an electromagnetic shielding layer connected to a grounding end of the terminal device, and at least a part of the electromagnetic shielding layer being located on the side of the fingerprint detection layer facing away from the touch display layer.

2. The terminal device according to claim 1, wherein at least a part of the electromagnetic shielding layer is attached to the side of the fingerprint detection layer facing away from the touch display layer.

3. The terminal device according to claim 2, wherein an orthographic projection of the fingerprint detection layer on the electromagnetic shielding layer is completely located on the electromagnetic shielding layer.

4. The terminal device according to claim 1, wherein the electromagnetic shielding layer is connected to the grounding end by a conductive member, and the conductive member is arranged at an edge of the electromagnetic shielding layer.

5. The terminal device according to claim 4, wherein the conductive member comprises at least one of a first flexible printed circuit board, a conductive fabric, and a conductive adhesive.

6. The terminal device according to claim 1, further comprising a casing, wherein the touch display layer is mounted to the casing, the fingerprint detection layer is mounted between the touch display layer and the casing, and the side of the fingerprint detection layer facing away from the touch display layer is attached to the casing through at least a part of the shielding layer.

7. The terminal device according to claim 6, wherein the casing is provided with a groove, wherein the groove has an opening facing the touch display layer, and the fingerprint detection layer and at least a part of the shielding layer are located in the groove.

8. The terminal device according to claim 6, wherein the shielding layer further comprises a buffer layer, and the buffer layer is attached between the electromagnetic shielding layer and the casing.

9. The terminal device according to claim 1, wherein the fingerprint detection layer is attached to the side of the touch display layer facing away from the touch display surface, and at least a part of the electromagnetic shielding layer is attached to the side of the fingerprint detection layer facing away from the touch display layer.

10. The terminal device according to claim 1, further comprising a signal reading module, wherein the signal reading module comprises a first reading chip and a second reading chip integrated as a whole, the first reading chip is connected to the fingerprint detection layer to read an electrical signal output by the fingerprint detection layer, and the second reading chip is connected to the touch display layer to read an electrical signal output by the touch display layer.

11. The terminal device according to claim 10, wherein the signal reading module is connected to the touch display layer and the fingerprint detection layer through a second flexible circuit board.

12. The terminal device according to claim 1, wherein an orthographic projection of the fingerprint detection layer on the touch display layer is equal to an area of the touch display layer.

13. The terminal device according to claim 1, wherein the fingerprint detection layer comprises a fingerprint sensing layer and a light adjusting layer arranged between the fingerprint sensing layer and the touch display layer; the light adjusting layer comprises a microlens array and a second collimating layer; the second collimating layer is arranged between the microlens array and the fingerprint sensing layer; and the second collimating layer is provided with a second collimating hole communicating the microlens array with the fingerprint sensing layer.

14. The terminal device according to claim 13, wherein the light adjusting layer comprises a first collimating layer, and the first collimating layer is provided with a plurality of first collimating holes connecting the touch display layer with the fingerprint sensing layer.

15. The terminal device according to claim 14, wherein the first collimating layer has a thickness of 0.2 mm, and the second collimating layer has a thickness of 0.05 mm.

16. The terminal device according to claim 13, wherein the fingerprint detection layer comprises a glass substrate, and the fingerprint sensing layer is formed on the glass substrate.

17. The terminal device according to claim 16, further comprising a signal reading module, wherein a first reading chip of the signal reading module is bonded to the glass substrate.

18. The terminal device according to claim 14, wherein the first collimating layer is adhered to the side of the touch display layer opposite facing away from the touch display surface through an optically clear adhesive layer.

19. The terminal device according to claim 13, wherein the microlens array is adhered to the side of the touch display layer facing away from the touch display surface through an optically clear adhesive layer.

20. The terminal device according to claim 19, wherein the optically clear adhesive layer and the microlens array have different refractive indexes.

\* \* \* \* \*